(12) United States Patent
Tremblay et al.

(10) Patent No.: US 7,356,461 B1
(45) Date of Patent: Apr. 8, 2008

(54) TEXT CATEGORIZATION METHOD AND APPARATUS

(75) Inventors: Dany Tremblay, Montreal (CA); Steve Pettigrew, Montreal (CA); Henri Roy, Lévis (CA)

(73) Assignee: Nstein Technologies Inc., Quebec (CA)

( * ) Notice: Subject to any disclaimer, the term of this patent is extended or adjusted under 35 U.S.C. 154(b) by 918 days.

(21) Appl. No.: 10/452,944

(22) Filed: Jun. 3, 2003

Related U.S. Application Data (63) Continuation-in-part of application No. 10/341,597, filed on Jan. 14, 2003, now abandoned.

(60) Provisional application No. 60/347,299, filed on Jan. 14, 2002.

(51) Int. Cl.
*G06F 17/20* (2006.01)
*G06F 17/30* (2006.01)

(52) U.S. Cl. ................... 704/9; 704/10; 707/2

(58) Field of Classification Search ............ 704/1, 704/10; 707/1, 2, 3, 7
See application file for complete search history.

(56) References Cited

U.S. PATENT DOCUMENTS

| | | | | |
|---|---|---|---|---|
| 6,029,167 A | * | 2/2000 | Evans | 707/4 |
| 6,038,561 A | * | 3/2000 | Snyder et al. | 707/6 |
| 6,052,714 A | * | 4/2000 | Miike et al. | 709/217 |
| 6,353,825 B1 | * | 3/2002 | Ponte | 707/5 |
| 6,571,225 B1 | * | 5/2003 | Oles et al. | 706/12 |
| 6,574,632 B2 | * | 6/2003 | Fox et al. | 707/102 |
| 7,062,498 B2 | * | 6/2006 | Al-Kofahi et al. | 707/101 |
| 7,065,514 B2 | * | 6/2006 | Yang-Stephens et al. | 707/2 |
| 2002/0103798 A1 | * | 8/2002 | Abrol et al. | 707/5 |
| 2002/0129015 A1 | * | 9/2002 | Caudill et al. | 707/6 |
| 2002/0156763 A1 | * | 10/2002 | Marchisio | 707/1 |
| 2003/0061201 A1 | * | 3/2003 | Grefenstette et al. | 707/3 |
| 2006/0089924 A1 | * | 4/2006 | Raskutti et al. | 707/1 |

OTHER PUBLICATIONS

Cohen, W.W. et al, (1996), "Context-Sensitive Learning Methods for Text Categorization" in Proceedings of SIGIR-96, 19th ACM International on Research and Development in Information Retrieval, pp. 307-315, New York, U.S.A.

Cavnar, W.B. et al, (1994), "N-Gram-Based Text Categorization", In Proceedings of the Third Annual Symposium on Document Analysis and Information Retrieval (SDAIR -94), pp. 161-175.

Furnkranz, J. et al, (1998), "A Case Study in Using Linguistic Phrases for Text Categorization on the WWW" In M. Sahami, editor, Proceedings of the A-98 Workshop on Learning for Text Categorization.

Joachims, T, (1997), "A Probabilistic Analysis of the Rocchio Algorithm With TFIDF for Text Categorization", in Proceedings of ICML-97, pp. 1-24.

(Continued)

*Primary Examiner*—Martin Lerner
(74) *Attorney, Agent, or Firm*—Merchant & Gould P.C.

(57) ABSTRACT

A method for categorizing a text is disclosed. A weight for at least one term of the text with respect to a category is computed and the determined weight is multiplied in order to obtain a weight of the category for the plurality of terms.

14 Claims, 3 Drawing Sheets

OTHER PUBLICATIONS

Lewis, D.D. et al, (1996) "Training Algorithms for Linear Text Classifiers", in H.P. Frei, D. et al, editors, Proceedings of SIGIR-96, 49th ACM International Conference on Research and Development on Information Retrieval, pp. 1-9, Zurich, Switzerland, (1996), ACM Press.

McCallum, A. et al, (1998) "A Comparison of Event Models for Naïve Bayes Text Classification", In Proceedings of AAAI-98 Workshop on Learning for Text Categorization.

Riloff, E. et al, (1994), "Information Extraction as a Basis for High-Precision Text Classification", in ACM TOIS, 12(3) pp. 1-36.

Yang, Y. et al, (1997) "A Comparative Study on Feature Set Selection in Text Categorization", in Proceedings of the Fourteenth International Conference on Machine Learning, pp. 412-420, Nashville, TN. Morgan Kaufmann.

Yang, Y., (1999), "An Evaluation of Statistical Approaches to Text Categorization", In Information Retrieval, vol. 1, No. 1-2, pp. 1-10.

\* cited by examiner

FIG. 4

TEXT CATEGORIZATION METHOD AND APPARATUS

CROSS-REFERENCE TO RELATED APPLICATIONS

This patent application is a continuation-in-part of U.S. patent application Ser. No. 10/341,597 filed Jan. 14, 2003 now abandoned, the specification of which is hereby incorporated by reference, and which claims priority of U.S. provisional patent application Ser. No. 60/347,299 filed Jan. 14, 2002 in the French language and entitled "Text categorization method and apparatus", the translation of which is filed with this application.

TECHNICAL FIELD

This invention pertains to the field of linguistics. More precisely, this invention relates to a text categorization apparatus.

BACKGROUND OF THE INVENTION

Today, users are overwhelmed by information. Information overload is a problem for two reasons.

A first reason is that it requires "knowledge worker" to locate a pertinent information. A second reason is that pertinent information is seldom found because a search is abandoned before the right information is found.

According to Outsell, July 2001, "In today's business, knowledge workers spend an average of 10 hours per week searching for information".

At a very basic level, a knowledge worker uses a search engine to look for information. The search engine looks for results by matching the worker query with information that is tagged or indexed within a plurality of documents. Today the "tagged information" is created manually. Because it is very expensive and time-consuming to do so manually, much of the available information is not tagged, and if it is, it is not done at a granular level. The granular level refers to a level that is more specific and fine-tuned that a non-granular level. The outcome of the process is that the knowledge worker cannot find the information at the right time because the information, he or she seeks, has not been tagged or identified within the plurality of documents.

Two types of approach are available in the domain of text categorization. A first approach is a categorization based on keywords. A second approach is a categorization based on data from texts of a pre-categorized training corpus.

Both approaches have their pros and cons. The keyword approach provides acceptable results as long as the keywords identified manually are found in the text. Contrarily, the statistic approach, using all the words of the text in a training corpus, must be able to recognize accurate returns from a much larger group of inaccurate returns. However, both approaches are limited when faced with ambiguity resolution with respect to the language and taxonomy used.

There is therefore a need for a method and apparatus that will overcome the above-identified drawbacks.

SUMMARY OF THE INVENTION

It is an object of the invention to provide a text categorization method and apparatus.

Yet another object of the invention is to provide a text categorization method and apparatus where an ambiguity is lifted.

According to a first aspect of the invention, there is provided a method for categorizing a text comprising a plurality of terms, comprising determining a weight of at least one term of the plurality of terms with respect to a category and multiplying together the determined weight of the at least one term of the plurality of terms with respect to the category in order to obtain a weight of the category for the plurality of terms.

According to a second aspect of the invention, there is provided a method of categorization comprising computing a degree of ambiguity of at least one term of a plurality of terms, computing a degree of association between the at least one term and a category of the plurality of terms, and computing the weight of terms of the plurality of terms according to the degrees of ambiguity and association.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

In accordance with the invention, an hybrid approach is used in order to provide a text categorization.

Information units comprised in the texts of a manually pre-categorized training corpus are preferably used as explained below.

Among other things, it uses complex information units, which are much more precise than simple word units. In order to lift ambiguity issues, surrounding words are used. More precisely, an ambiguity is lifted using either words located near an ambiguous word or by using then entire word content of the text. It has been contemplated that combination of the two methods can itself create ambiguity.

A local disambiguation is carried out using a method that uses information units of the paragraph comprising an ambiguous information unit. The local disambiguation is carried out by using a multiplying process which enables to extract the real local meaning of the information unit in the paragraph.

After such step, persistent ambiguities are lifted when a global disambiguation assembles the data analyzed for various paragraphs. At this step and contrary to the preceeding step, an additive technique is preferably used. Errors created in the first step, such as failure to solve small local ambiguities, are then corrected globally.

It will be appreciated that this invention is very flexible as much in its calculation as in the filters used at the end of the process. It will further be appreciated that the preferred embodiment of the invention enables addition of a self-enrichment unit. Such self-enrichment unit updates data regarding categories of a taxonomy and keeps track of the evolution of information units. Furthermore it enables a text to be quickly categorized since it does not get tangled up in complex rules. It will be appreciated that the preferred embodiment requires very few technical adjustments. However, a knowledge base constructed from a pre-categorized training corpus is preferably required.

Figure 1:
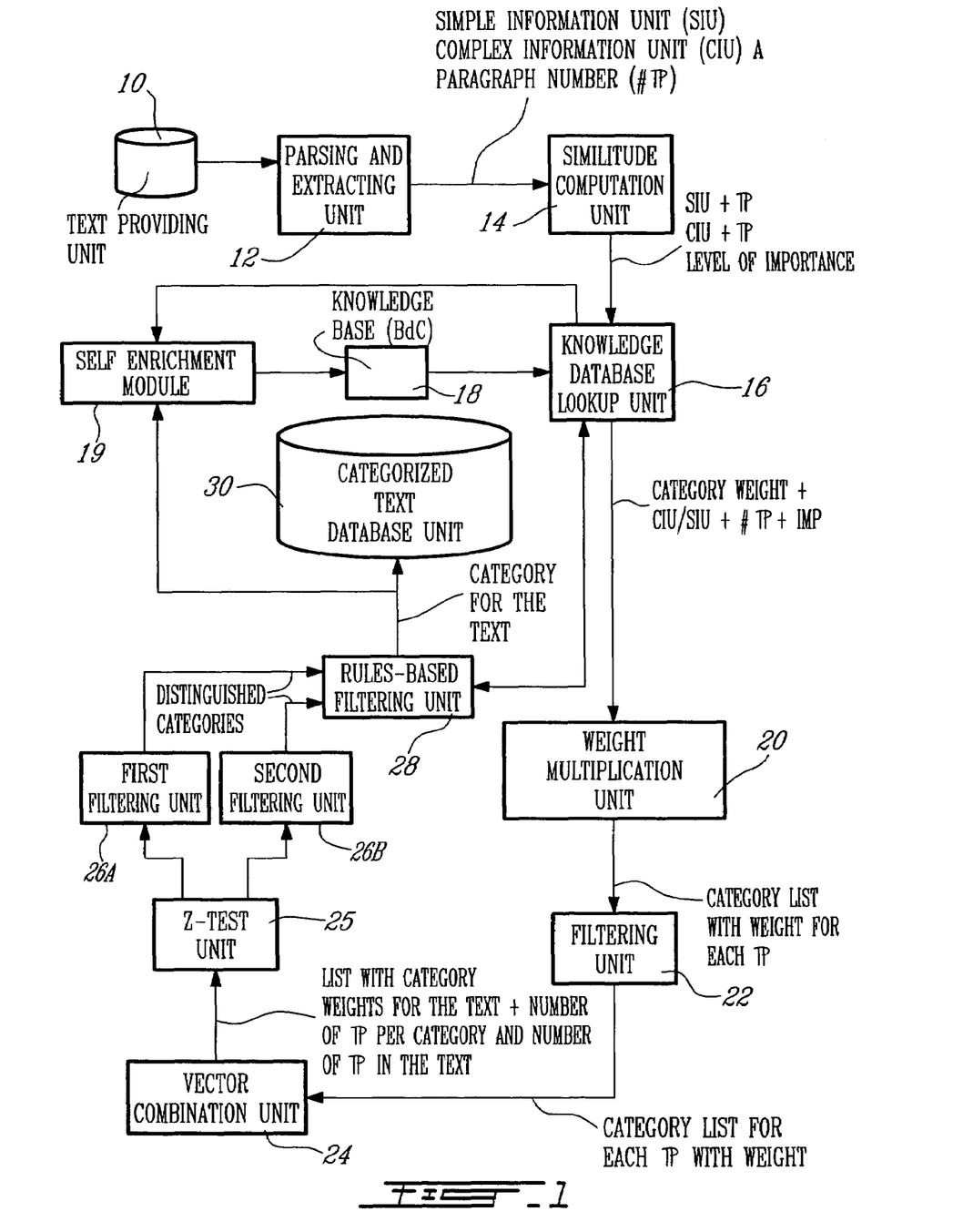
FIG. 1 is a block diagram which shows the preferred embodiment of the invention.

Now referring to FIG. 1, there is shown the preferred embodiment of the invention.

In the preferred embodiment, the apparatus comprises a text providing unit 10, a parsing and extracting unit 12, a similitude computation unit 14, a knowledge database 18, a knowledge database lookup unit 16, a self-enrichment module 19, a weight multiplication unit 20, a filtering unit 22, a vector combination unit 24, a Z-test unit 25, a first filtering unit 26a, a second filtering unit 26b, a rule-based filtering unit 28 and a search engine and categorized text database unit 30.

A simple unit of information relates to a word of a language which is susceptible of carrying a meaning which is substantially precise with respect to at least one category of a taxonomy. It will be appreciated that defining a simple unit of information depends on a degree of precision and depends on a simple unit of information extractor used. For instance, a simple unit of information extractor which favors recall may identify the word "hello" as being a simple unit of information, while another extractor which favors precision may reject this word. A list of keywords by degree of taxonomy is considered as a list of simple unit of information.

A complex unit of information is either a real term such as "lexical statistic" or it can be a plurality of terms such as "playing street hockey".

For each text comprised in a manually pre-categorized training corpus, an information unit extraction unit provides a knowledge database 18 with a list of simple unit of information (SUI) with a list of complex unit of information (CUI), together with their corresponding frequency of appearance in the text and the categories associated with the text.

After extracting the information units in the pre-categorized training corpus, the knowledge database 18 comprises for each information unit the number of texts of the pre-categorized training corpus from which the information unit was extracted, a number of texts of the corpus associated with a given category C from which the information unit was extracted followed by the frequency of total appearance of the information unit in the texts.

For instance, accident C1(7), C5(4), C2(3), C9(3) was extracted from 7 texts associated to category C1, from 4 texts associated to category C5, etc.

The knowledge database 18 further comprises statistical data related to the distribution of categories in the training corpus. For each of the categories C, the information is a number of texts in the training corpus associated to a given category C, the number of times, within the training corpus, that other categories of the taxonomy were found to be associated at least once, to a text at the same time as the given category C.

For instance, for a category of the taxonomy, C00002; C00002[72], C00307[11], C00162[2], C00276[1], C00381[6], C00244[1], C00323[1], C00328[1]. This example illustrates that 72 texts of the training corpus are associated to the category C00002. It further illustrates for example the fact that category C00307 is associated to 11 texts that are in common with category C00002.

Figure 2:
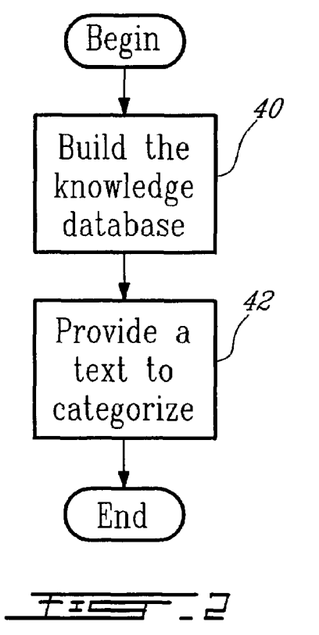
FIG. 2 is a flowchart which shows the preferred embodiment of the invention; according to a first step a knowledge base database is created; according to a second step, a text to categorize is provided.

Now referring to FIG. 2, there is shown the preferred embodiment of the invention.

According to step 40, the knowledge database 18 is built. The knowledge database 18 is built using a corpus of text as explained above.

According to step 42, a text to categorize is provided.

Figure 3:
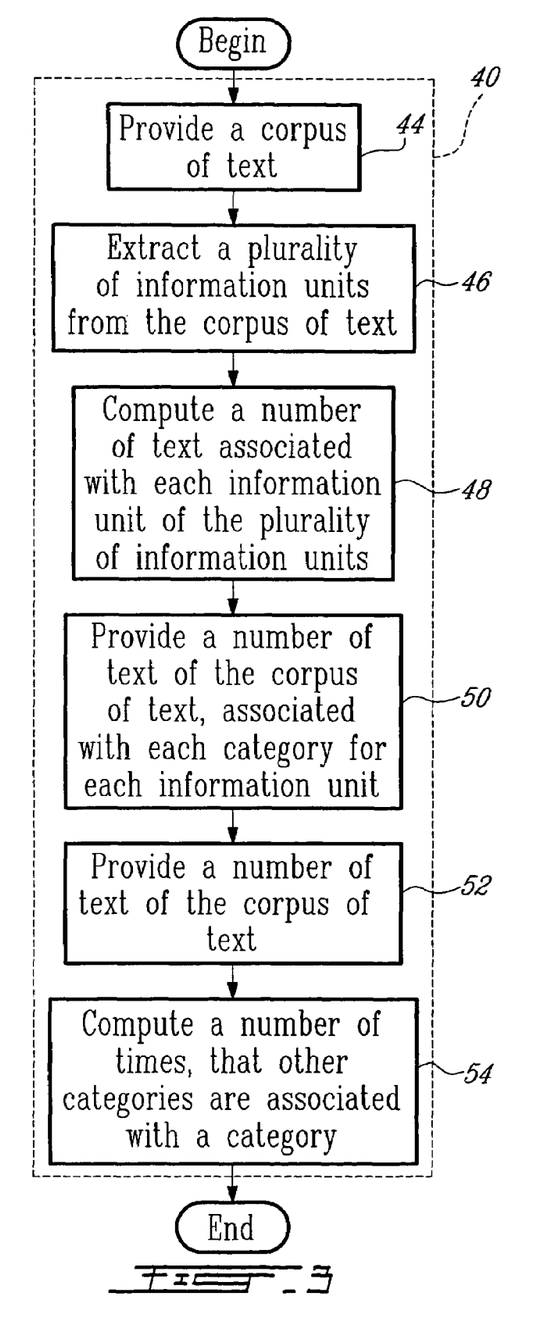
FIG. 3 is a flowchart which shows how the knowledge database is created.

Referring to FIG. 3, there is shown how the knowledge database 18 is built.

According to step 44, a corpus of text is provided. The corpus of text comprises a plurality of manually pre-categorized texts.

According to step 46, a plurality of information units is extracted from the corpus of text. As explained above, an information unit is either a simple information unit or a complex information unit. The information units are extracted using an information unit extraction module.

According to step 48, a number of text of the corpus of text, associated with each information unit of the plurality information units extracted is computed.

According to step 50, a number of text of the corpus of text, associated with each category is provided for each information unit of the plurality of information units extracted.

According to step 52, a number of text of the corpus of text, associated with a category is provided.

According to step 54, a number of times, that other categories are associated with a category is computed.

Now referring back to FIG. 1, the text providing unit 10 provides a text signal to the parsing and extracting unit 12.

The parsing and extracting unit 12 receives the text signal. The parsing and extracting unit 12 further parses the received text and extracts a plurality of complex units of information and a plurality of simple units of information. The text signal is then parsed into paragraph.

Preferably, precision is preferred in the parsing and extracting unit 12. Recall is a measure of how much relevant information the parsing and extracting unit 12 has extracted from the text. More precisely, recall is defined as a number of correct answers given by the parsing and extracting unit 12, divided by a total number of correct answers in the text.

Precision is defined as a number of correct answers provided by the parsing and extracting unit 12 divided by a number of answers provided by the parsing and extracting unit 12.

The parsing and extracting unit 12 further provides for each information unit a position in the provided text. In the preferred embodiment, the position is defined using a paragraph number.

In an alternative embodiment, the title of the text is tagged differently and it is processed according to an alternate scheme.

The parsing and extracting unit 12 provides each information unit with its position in the provided text to the similitude computation unit 14.

The similitude computation unit 14 operates as follows.

Each complex information unit of the plurality of information units is compared with another complex information unit in order to compute a similitude ratio. An average similitude score is then computed for each complex information unit by computing an average of each similitude ratio computed for the complex information unit.

While it will be appreciated that a similitude ratio between a first complex information unit and a second complex information unit may be computed using various algorithms, the similitude ratio is preferably computed by parsing the first complex information unit and the second complex information unit into bi-grams and by then computing a percentage of common bi-grams between the first complex information unit and the second complex information unit. Alternatively, n-grams may be used.

The similitude computation unit 14 further orders each complex information unit according to their related average similitude score.

More precisely, each complex information unit is ordered in a zone. S1, S2, . . . , Sk define average percentages of similitude corresponding to k extracted complex information units of a given text. Three zones n1, n2, and n3 are determined in the following way.

$s_i \in n_1$, if $s_i \geq ((\frac{2}{3}) \cdot \text{Max}\{s_1, s_2, \ldots, s_k\} + (\frac{1}{3}) \cdot \text{Min}\{s_1, s_2, \ldots s_k\})$;

$s_i \in n_2$, if $((\frac{1}{3}) \cdot \text{Max}\{s_1, s_2, \ldots, s_k\} + (\frac{2}{3}) \cdot \text{Min}\{s_1, s_2, \ldots, s_k\}) \leq s_i < ((\frac{2}{3}) \cdot \text{Max}\{s_1, s_2, \ldots, s_k\} + (\frac{1}{3}) \cdot \text{Min}\{s_1, s_2, \ldots, s_k\})$;

$s_i \in n_3$, if $s_i < ((\frac{1}{3}) \text{Max}\{s_1, s_2, \ldots, s_k\} + (\frac{2}{3}) \cdot \text{Min}\{s_1, s_2, \ldots, s_k\})$;

It will therefore be appreciated that with such classification, an importance of each complex unit of information is provided. It will be appreciated for instance that $n_1$ relates to a complex information unit having a high level of importance, while $n_3$ relates to a complex information unit having a low level of importance.

The similitude computation unit 14 therefore provides to the knowledge database lookup unit 16 a list comprising the list of the plurality of simple information units with the position in the text of each of the plurality of simple information units together with the list of the plurality of complex information units with the position in the text of each of the plurality of complex information units together with the level of importance computed for each of the plurality of complex information units.

The knowledge database lookup unit 16 performs a search in the knowledge database 18 created according to step 40. The search is performed using the list of the plurality of simple information units and the list of the plurality of complex information units.

According to a first step of the search, the knowledge database lookup unit 16 removes from the list of the plurality of simple information units and from the list of the plurality of complex information units, each simple information unit and each complex information unit that are not located in the knowledge database 18.

In an alternative embodiment, the removed complex information units and the removed simple information units are further provided to the self-enrichment unit 19. According to categories generated by the rule-based filtering unit 28, the self-enrichment unit 19 performs necessary updates in the knowledge database 18 using the removed complex information units and the removed simple information units.

It will be appreciated that the knowledge database lookup unit 16 retrieves, from the knowledge database 18, data related to at least one category. In fact, for each of the at least one category located, the number of texts associated to a given category in the training corpus is extracted. Using the number of texts associated to the given category, a statistic process is started to determine the at least one category to which the text is associated to. The process starts with a computing of weight of the terms with respect to a category to which it is associated to and ends with a selection of at least one category which distinguishes itself from the others of the text.

The knowledge database lookup unit 16 provides data collected from the knowledge database 18 and remaining information units to the weight multiplication unit 20.

The weight multiplication unit 20 computes a weight for each of the information units with respect to the at least one category.

The at least one category with which an information unit is associated to in the knowledge database 18 as well as a frequency of association of the at least one category are then added to each information unit of the remaining information units.

Preferably, the information units are lemmatized using a stemming system. The stemming system is a morphological parser which parses a word into its stem and at least one corresponding affix, if applicable. The stem of the word is the main morpheme of the word, which provides the principal meaning of the word while the at least one corresponding affix provides additional meaning of various kind to the principal meaning.

Computing a weight of an information unit with respect to a given category C involves using all information associated to the term in the list provided by the knowledge database lookup unit 16.

CF relates to a frequency of an information unit with respect to a given category C. CFi (i=1, . . . , n) relates to frequencies of the information unit with respect to n categories to which it is associated to.

The computation comprises using a number of categories associated to the term as well as the number of texts that were used to construct the knowledge database 18 for that given category. In the case where the information unit is a complex information unit, the level of importance computed previously is added.

Figure 4:
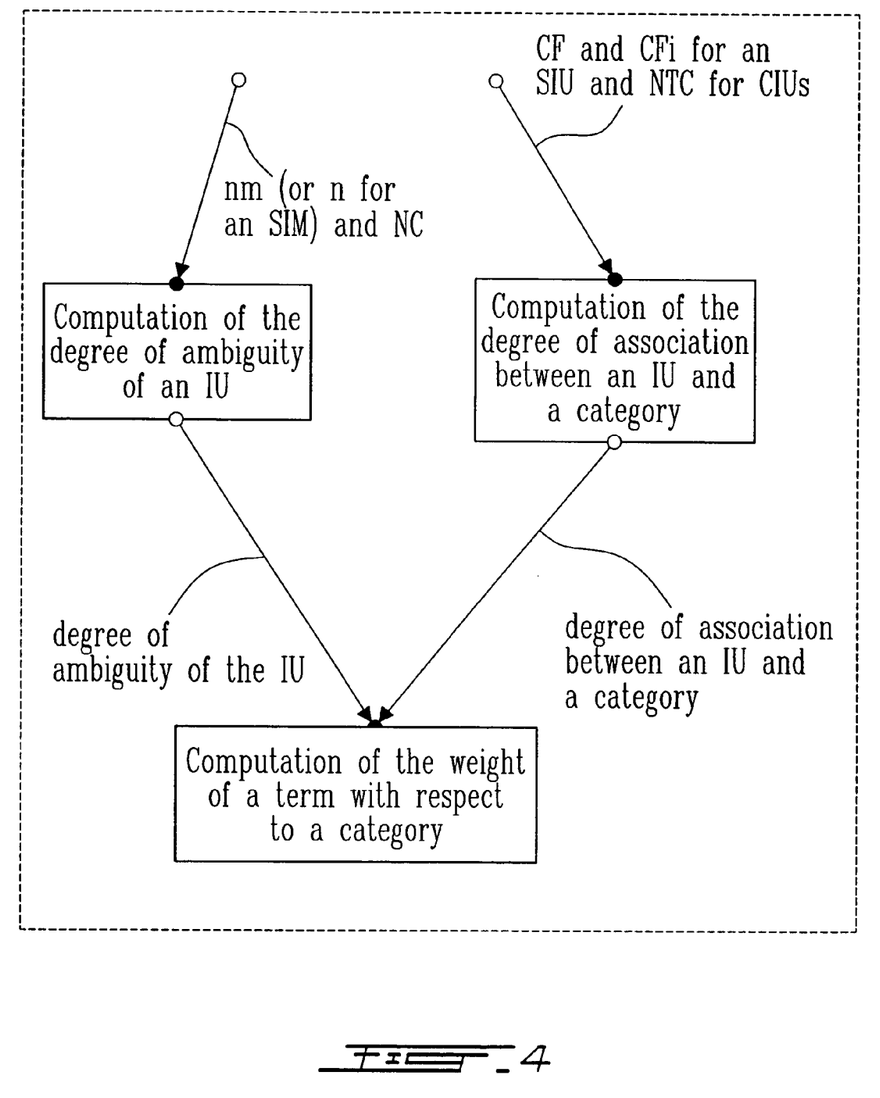
FIG. 4 is a flowchart which shows how computation is performed.

Now referring to FIG. 4, there is shown how the computation is performed.

The computation combines two measures, a degree of ambiguity of an information unit with respect to a category and a degree of association of an information unit with respect to a category. Such degrees are referred to as weights. The calculation of the degree of ambiguity is carried out in the following way in the preferred embodiment of the invention.

For a complex information unit, the degree of ambiguity is equal to $$\left(1 + \frac{n_m}{(\log_{10}(10 + NC))^2}\right),$$

while for a simple information unit, the degree of ambiguity is equal to $$\left(1 + \frac{n_m}{(\log_{10}(10 + NC))^2}\right)$$

where $n_m (m \in \{1,2,3\})$ represents a level of importance of the complex information unit, and $n_m$ may be adjusted in order to optimize the system with respect to the knowledge database 18. Default values are $n_1=3$, $n_2=2$, $n_3=0.5$. In the same way, there is a fixed value n for simple information units, which is a definable parameter. The default value of the definable parameter is equal to 0.5.

It will be appreciated that it is possible to add a module in order to determine the level of importance of a simple information unit and, consequently, to vary this definable parameter in order to obtain more precision in the measure of the weight of a simple information unit. In fact, complex information units are much more precise than simple information units for determining the categories of a text, which explains why the values for $n_t$ are greater than the values for n.

It will further be appreciated that the exponent 2 applied to the decimal logarithm is also a definable parameter with respect to the number of categories as well as to characteristics of the taxonomy. In fact, the higher the exponent is, the more the information units lose importance in proportion to the number of categories to which the information units are associated.

The degree of association is computed using the following formulas.

For a simple information unit, the degree of association is equal to $$\left( \frac{\sum_{i=1}^{n} CFi + CF}{\sum_{i=1}^{n} CFi} \right)^a,$$

while for a complex information unit, the degree of association is equal to $$\left(1 + \frac{CF}{NTC}\right)^b.$$

Preferably, the default setting for parameters a and b are 1 and 2, respectively.

The total weight of a term with respect to a category C is computed by combining the last two measures as explained below.

For the complex information units, the total weight of a term is equal to $$\left(1 + \frac{n_m}{(\log_{10}(10 + NC))^2}\right)\left(1 + \frac{CF}{NTC}\right)^b.$$

For the simple information units, the total weight of a term is equal to $$\left(1 + \frac{n}{(\log_{10}(10 + NC))^2}\right)\left( \frac{\sum_{i=1}^{n} CFi + CF}{\sum_{i=1}^{n} CFi} \right)^a.$$

The knowledge database lookup unit 16 adds the weight of information units with respect to each of the categories to which they are associated to the information comprised in the list produced by the similitude computation unit 14. It is important to mention that categories not associated to an information unit in the knowledge database 18 are not considered while calculating the weight of categories.

The list is amended in order to order each information unit according to a category. More precisely and for each paragraph of the text, the list is divided into a number of sub-lists which are not necessarily disjoints. The number of sub-lists is equal to the number of categories located in a preceding list of information units.

All required information for computing a weight of a category by paragraph of the text is gathered together using the weight multiplication unit 20. For each of the sub-lists provided by the knowledge database 18 and thus for each of the categories represented in the text with respect to the knowledge database 18, the weight, corresponding to the quantity of information associated with a category in a paragraph is computed. The multiplying technique used by this computation enables to locally and very rapidly disambiguate the information units contained in a paragraph.

In fact, an information unit is usually associated to several categories in the knowledge database 18. Presence of other recognized information units helps to determine the categories which are highly associated to a paragraph.

It will be appreciated that ambiguities that might have existed for some information units are resolved using close location between the information units of a paragraph, as well as a rapid disambiguation process described here.

All simple information units associated to a given category in a given paragraph are referred to as $C_{siu}(P)$ while all complex information units associated to a given category in a given paragraph are referred to as $C_{ciu}(P)$. The weight of a given category C for a given paragraph P is determined by $$\prod_{C_{ciu}(P)} \left(1 + \frac{n_m}{(\log_{10}(10 + NC))^2}\right)$$

$$\left(1 + \frac{CF}{NTC}\right)^b \prod_{C_{siu}(P)} \left(1 + \frac{n}{(\log_{10}(10 + NC))^2}\right)\left( \frac{\sum_{i=1}^{n} CFi + CF}{\sum_{i=1}^{n} CFi} \right)^a.$$

It will be appreciated that an absence of information units, simple or complex, does not cause the preceding equation to be multiplied by zero.

The weight multiplication unit 20 provides, for each paragraph, a list of categories with their related weight.

It will be appreciated that there are as many category lists as there are paragraphs comprising at least one recognized information unit in the knowledge database 18.

The filtering unit 22 receives the list of categories with their related weight for each given paragraph and operates as a pre-filter before combining the weights of the paragraphs.

For a given paragraph P, to which a list of categories is associated, a sub-list of categories is extracted. The sub-list of categories comprises at least one category of the list of the categories which distinguished itself from others categories.

More precisely, the filtering unit 22 evaluates statistic distribution of each weight of each category of the categories in order to determine a dynamic threshold for the categories of the given paragraph.

Average m and standard deviation s of the weights of the categories of the given paragraph are computed. The categories that have a weight greater than m+s/2 are kept for that given paragraph.

It will be appreciated that it is possible to add parameters to m+s/2 in order to be more or less severe; a general format is xm+ys. It will be appreciated that such pre-filtering is performed for each paragraph.

Upon completion of this pre-filtering, the filtering unit 22 provides a plurality of filtered lists to the vectorial combination unit 24.

In the preferred embodiment of the invention, the vectorial combination unit 24 combines the weights of the categories of each paragraph.

A final weight of a category is computed using a "summative" combination, enabling more weight to be given to a category which is located in the entire text or which is located prominently in a few paragraphs of the text.

$P_i$ is referred to as the weight of a given category C in paragraph i.

In the case where there are n paragraphs in the text, the weight of the given category C for the text is computed as $$Pc = \sum_{i=1}^{n} Pi.$$

It will be appreciated that in the case where the category C is not found in paragraph i, $P_i=0$ by default.

In order to normalize $P_i$ according to size ti (number of characters, number of words, number of information units recognized, etc.) of the paragraph i, it is possible to insert a normalizing function $f(t_i)=k/\log(t_i)$, where k is a constant, in the computation of $P_c$, such that $$Pc = \sum_{i=1}^{n} p_i^{f(ti)}.$$

In the case where the title is recognized, it is possible to replace the constant k, in the function f, with a special constant $k_{titre}$ in order to assign a desired importance to the title.

The constant k may also decrease according to the paragraph number of the text. Someone skilled in the art will appreciate that a first paragraph may be considered as being more important than a second paragraph, etc.

In the case of a newspaper article, the first paragraph is often the most important paragraph of the text.

The vectorial combination unit 24 provides a list comprising categories C with their respective weight in the text $P_c$ together with a number identifying an amount of paragraphs, in the text, in which they are contained.

The list is then provided to a second filtering unit 26, which will determine categories of the text that distinguish themselves from others. The total number of paragraphs that are associated to each category is also transmitted to the second filtering unit 26.

According to a first step, the filtering unit 26 computes average m and standard deviation s of the weight of the categories comprised in the list provided by the vectorial combination unit 24.

Preferably, at most, the first 30 categories having the highest weights, are kept in order to be used for this computation.

Using the computed average m and the computed standard deviation s, a check is performed in order to find out if there is a category C for which $$\frac{Pc - m}{s} > 3.$$

Such z-test test is performed using the z-test module 25.

In the case where at least one category passes the z-test, filtering unit 26a is used while in the case where no category passes the z-test, filtering unit 26b is used.

In the case where there are categories C, such that $$\frac{Pc - m}{s} > 3,$$

such categories C are automatically kept for the text.

Someone skilled in the art will appreciate that the z-test test is used in order to identify whether there is data from a distribution that is distinguished from others in a positive direction.

The number of categories succeeding the z-test is counted and referred to as $Z_c$.

Among remaining categories, only those having a weight $P_c$ greater than $$m_2 + \frac{(6Zc + 4)s_2}{4}$$

are kept for the text, where $m_2$ and $s_2$ represent the average and the standard deviation, respectively, of the category weights after having removed the first $Z_c$ category(ies) from the list.

The $Z_c$ categories kept by the z-test as well as those which passed the second test, if applicable, constitute the output of the filtering unit 26a.

With respect to filtering unit 26b, only categories C having a weight $P_c$ greater than a predefined threshold are kept for the text.

In the preferred embodiment, the predefined threshold is equal to $$m + \frac{(3(s/m - 2)^2 + 4)s}{16}.$$

The categories having a weight PC greater than the predefined threshold are outputted by the filtering unit 26b.

Someone skilled in the art will appreciate that it is possible to change constant parameters comprised in the formulas $$m_2 + \frac{(6Zc + 4)s_2}{4}$$

and $$m + \frac{(3(s/m - 2)^2 + 4)s}{16},$$

in order that the formulas are more or less severe in attributing a category to a text. Moreover, alternatively, it is possible to establish various thresholds according to the distribution of category weights or even according to the quality and the quantity of information units recognized in the text.

The rule-based filtering unit 28, in the present preferred embodiment, evaluates pertinence of the categories provided by the filtering unit 26a and by the filtering unit 26b using a predefined set of rules.

It will be appreciated that such rule-based filtering unit 28 is optional.

A first rule, of the predefined set of rules, relates to the fact that a category having a strong presence only in one or in a few paragraph of the text may be rejected. Such rule is implemented by defining a threshold, such that a given category below the defined threshold is not included in the final result. It will be appreciated that this defined threshold may be defined as a minimum number of paragraphs, or alternatively as a percentage of paragraphs in the text which comprises the given category.

Another rule, of the predefined set of rules, relates to a checking in order to identify whether given categories are compatible between themselves from associations observed in the training corpus or not.

It has been contemplated that there exists a risk of error among provided categories, when two of these categories were never associated to a same text for a very large corpus. A basic algorithm for this filter is as follows.

The category with the highest weight is kept and compared to the other categories having a lower weight with respect to the data comprised in the knowledge database 18 concerning the categories. If a pair of categories was never observed to be associated together in the training corpus, then the category of the two categories having the lower weight is filtered. The second category of the new list of categories is then considered and a similar test is performed. Such process is repeated until the last category is reached.

It will be appreciated that using conditional probabilities (Bayes theorems), it is possible to advantageously implement a more or less dynamic filter.

Various other types of rules may be applied to categories of the rule-based filtering unit 28.

For instance, a filtering rule may be implemented according to a hierarchy of the taxonomy. Alternatively, a filtering rule may be implemented according to a presence of keywords of a given category. Alternatively, a filtering rule may be implemented for allowing to certify a precision of categories according to characteristic signs comprised in the text such as sections of a newspaper, column, author, source, etc.

Remaining categories of the text are outputted by the rule-based filtering unit 28.

The remaining categories of the text may alternatively be transmitted to search engine and categorized data and text database 30 which stores categorization results of the text. The search engine and categorized data and text database 30 has various functions like texts searching, automatic classification of texts, etc.

The embodiments of the invention described above are intended to be exemplary only. The scope of the invention is therefore intended to be limited solely by the scope of the appended claims.

We claim:

1. A method for categorizing a text comprising a plurality of terms, comprising:
   determining a term score of at least one term of said plurality of terms with respect to a category of a taxonomy, which comprises:
   computing a similitude ratio between at least two terms; and
   accessing a database using the computed similitude ratio to provide the term score of the at least one term with respect to the category, which comprises retrieving from the database at least one category together with a coefficient for the at least one term, wherein the term score of the at least one term with respect to a category is computed using at least the coefficient of the at least one term and the similitude ratio of the at least one term with respect to the category, and
   computing the product of said determined term score of the at least one term of said plurality of terms with respect to the category in order to obtain a category score for the plurality of terms.

2. The method as claimed in claim 1, wherein the computing of the term score of the at least one term with respect to a category comprises computing a degree of ambiguity of the at least one term, computing a degree of association between the at least one term and a category and multiplying the computed degree of association with the computed degree of ambiguity to provide the term score of the at least one term with respect to the category.

3. The method as claimed in claim 2, wherein the term is a simple information unit, and wherein the degree of ambiguity of the term is equal to $$\left(1 + \frac{n_m}{(\log_{10}(10 + NC))^2}\right),$$

where nm is a coefficient of importance of said term and NC is the total number of categories associated to said term.

4. The method as claimed in claim 2, wherein the term is a complex information unit, and wherein the degree of ambiguity of the term is equal to $$\left(1 + \frac{n_m}{(\log_{10}(10 + NC))^2}\right),$$

where nm is a coefficient of importance of said term and NC is the total number of categories associated to said term.

5. The method as claimed in claim 2, wherein the term is a simple information unit, and wherein said degree of association is equal to $$\left(\frac{\sum_{i=1}^{n} CFi + CF}{\sum_{i=1}^{n} CFi}\right)^a,$$

where CFi (i=1, ..., n) relates to frequencies of the term with respect to n categories to which it is associated and wherein a is a coefficient.

6. The method as claimed in claim 5, wherein a is equal to 1.

7. The method as claimed in claim 2, wherein the term is a complex information unit, and wherein said degree of association is equal to $$\left(1 + \frac{CF}{NTC}\right)^b,$$

where CF relates to frequencies of the term with respect to said category, where b is a coefficient and where NTC is the number of texts associated to said category.

8. The method as claimed in claim 7, wherein b is equal to 2.

9. The method as claimed in claim 1, wherein the determining of a term score of at least one term of the plurality of terms is performed with respect to at least one category of a plurality of categories, and wherein the product of said determined term score of said plurality of terms with respect to the category is performed in order to obtain a plurality of category scores, each of the plurality of term scores of the at least one term being related to a category of the plurality of categories, other comprising filtering the plurality of category scores wherein:

the filtering of the plurality of category scores for a plurality of terms comprises selecting at least one category of the plurality of categories according to a dynamic filtering threshold; and the text comprises a plurality of paragraphs, wherein the filtering of the plurality of category scores is performed for each paragraph of the plurality of paragraphs, further comprising filtering the filtered plurality of category scores for each paragraph to provide a filtered plurality of text category scores, which comprises normalizing the filtered plurality of category scores according to statistical data related to each paragraph.

10. The method as claimed in claim 9, wherein the filtering of the filtered plurality of text category scores is performed using a z-filter.

11. The method as claimed in claim 9, wherein the filtering of the filtered plurality of text category scores is performed using a rule-based filter.

12. The method as claimed in claim 11, wherein the rule-based filter rejects a category having a high text category score only in one or in a few paragraphs of the text.

13. The method as claimed in claim 11, wherein the rule-based filter checks if a first category is compatible with a second category and rejects the first category in the case where the first category is not compatible with the second category.

14. The method as claimed in claim 11, wherein the rule-based filter operates according to a hierarchy in a taxonomy.

* * * * *